May 29, 1951  F. O. CHURCH  2,554,815
PNEUMATIC TIRE AND SAFETY TUBE

Filed Sept. 25, 1947  2 Sheets-Sheet 2

INVENTOR.
Franklin O. Church
BY
Benj. T. Rauber
ATTORNEY

Patented May 29, 1951

2,554,815

UNITED STATES PATENT OFFICE 2,554,815

PNEUMATIC TIRE AND SAFETY TUBE

Franklin O. Church, Buffalo, N. Y., assignor to Dunlop Tire and Rubber Corporation, Buffalo, N. Y., a corporation of New York Application September 25, 1947, Serial No. 776,059

3 Claims. (Cl. 152—342)

My invention relates to a pneumatic tire and safety tube.

Heretofore the casings of pneumatic tires have been provided with single-walled tubes which filled the entire space within the tire casing and served to contain the inflated air under pressure. These tubes were of thin stretchable rubber or rubber composition, and in the event of a rupture or puncture of the casing the tube was ruptured at the same time causing a complete collapse of the tire. When this occurred at high speeds it tended to make the vehicle unmanageable and was a potential cause of accidents.

In my invention I provide a single-walled inner tube which fills the space between the bead portions of the casing to seal the casing air-tight and which extends outwardly beyond the rim portion and into the casing a distance less than that required to fill the casing completely and thereby leaves a short space between the tread portion of the casing and the outermost periphery of the tube.

The tube is reinforced with suitable fabric to limit its expansion in the event of a rupture of the casing and to increase its resistance to rupture and abrasion upon coming into contact with the road surface.

The tube is provided with a tire valve through which it may be inflated with air under pressure in the usual manner. The pressure thus imparted to the interior of the tube tends to press it toward the bead portions of the tire and thereby form an air-tight seal with the casing.

The reinforced part of the tube beyond the rim portion is provided with openings or passages through which the air may escape slowly into the space between the tube and the casing. These passages may be controlled by means of suitable valves to permit the air to flow from the tube into the casing on a predetermined or slight difference in pressure or, reversely, into the tube upon any reversed difference of pressure, providing a slight excess of pressure in the tube, giving a rigidity which holds it firmly against side sway or contact with the casing.

With the above construction, in the event of a blow out or rupture of the casing, the inner tube which is not in contact with the casing is unaffected. Therefore it holds its pressure for a substantial period of time and keeps the tire at very nearly its normal peripheral dimension, permitting the vehicle to be brought to a stop before any dangerous deflation of the tire takes place.

The tube of my invention is of simple construction and may be easily inserted into and removed from a tire casing when deflated.

The various features of my invention are illustrated, by way of example, in the accompanying drawings in which Fig. 1 is a cross-section, that is, a section taken on a plane radial to the axis of a tire embodying a preferred form of my invention;

Figure 1:
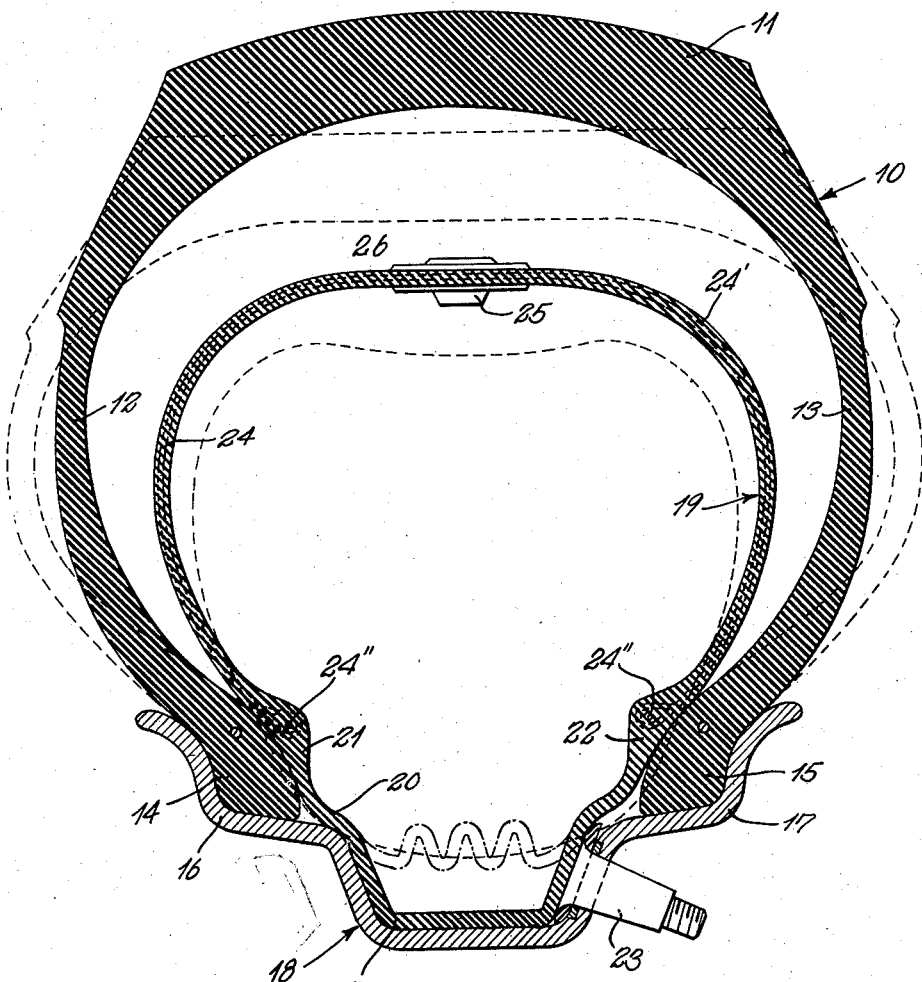

Referring more particularly to Fig. 1 of the drawing, my invention comprises an outer casing 10 having a thread portion 11, side walls 12 and 13 and bead portions 14 and 15 which fit the stepped recesses 16 and 17 of a rim 18. Within the tire casing is an inner tube 19 having a rim portion 20 which fills the rim 18, and at 21 and 22 fits against the inner surface of the bead portions 14 and 15. The rim portion 20 may be molded with corrugations at its lower part, as indicated in broken lines, to enable it to fit down into the well of the rim without excessive transverse sectional stretch. A tire valve 23 is provided in the rim portion 20 of the tube to inflate or deflate the tube.

The tube has wall portions extending outwardly from the rim portion 20, as at 24, so as partly to fit the space within the casing 10. These walls are reinforced with fabric which may be turned about relatively inextensible beads 24" at about the level of the casing beads as, for example, with two plies of cord fabric 24' to limit the stretch or expansibility of the wall under pressure. The tube is provided at some part of the wall portion 20 with openings controlled by valves 25 to permit the inflating air to pass from the interior of the tube to a space 26 between the tube and the tire casing and thus enable the tire to be inflated. Preferably the valves 25 permit air to pass from the tube to the space 26 slowly under a small but substantial difference in pressure but to return from the space 26 to the tube whenever the pressure in the tube may fall even slightly below the pressure in the space 26.

By providing a small excess of pressure in the tube over that existing in the space 26 the tube is given a tautness or stiffness which will hold it rigidly in position during a normal rotation of the tire and prevent it from wobbling or shimmying, and so affecting steering, upon making turns, etc.

By means of this slight excess of pressure the tube may be caused to assume a slight expansion from the form in which it is molded, as shown in broken lines, to the position when it is inflated, as shown in full lines.

The position of the casing when deflected under load is that shown in broken lines, there being sufficient space between the casing and the outermost part of the tube to prevent contacting and chafing of the tube against the casing. Upon rupture of the casing the tube may expand outwardly somewhat, thereby more nearly approaching the position of the casing and avoid a sudden drop of the wheel. In the event of rupture of the casing, air will escape from the tube into the atmosphere through valve 25 but slowly enough so that the wheel is supported without sudden drop until the speed of the vehicle may be reduced.

Figure 3:
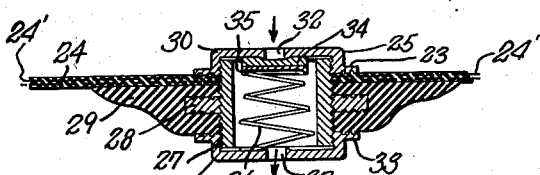
Fig. 3 is a section through a control valve for controlling the passage of air from the space between the casing and tube into the interior of the tube, for the flow from the interior thereof to the space between the tube and the casing, the rubber backing, disk and spring would be reversed.

The valves may be mounted in any suitable part of the wall of the tube beyond contact with the bead portions of the casing. Any suitable type of air control passages or valves may be employed to control the flow of air into and out of the tube. A valve of simple construction for this purpose is shown in Fig. 3. This valve comprises a short cylinder 27 of brass or other metal or rigid material, threaded on its outer surface, on which is run a collar 28 to about mid portion of the cylinder 27. A base 29 of rubber composition is molded about the ring and cylinder to the position shown in Fig. 3, and vulcanized. The ends of the tube are then closed by a pair of caps 30 and 31 which are interchangeable and each of which is provided with an opening 32 and a flange 33.

Within the cylinder 27 is provided a soft rubber disk 34 backed by a metal disk 35 and a helical spring 36 which serves to press the disk against one of the openings 32. These valves are in the nature of a check valve and will permit the passage of air in one direction only. The amount of pressure required to open the valve may be predetermined by suitable selection and tensioning of the spring, it being understood that the tension will be such as to permit the return of air to the tube under very slight difference of pressure but will require a substantial difference in pressure for the escape of air from the interior of the tube to the space 26, the openings being of sufficient size to permit only a slow passage of air in any event.

In mounting the valve on the tube the inside cap 30 or 31 remains on the tube while the outer cap, that is the cap nearest the wall of the mold, the springs, and the disks, are removed. The valve is assembled to the tube with the rubber base 29 in contact with the wall of the tube prior to the splicing of the plies to the tube. A temporary cap which conforms to the shape of the mold is screwed to the outer end of the cylinder 27 to seal it down tight and for removal after curing of the tube. The tube with the rubber base 29 of the valve is then vulcanized or cured under pressure.

Figure 2:
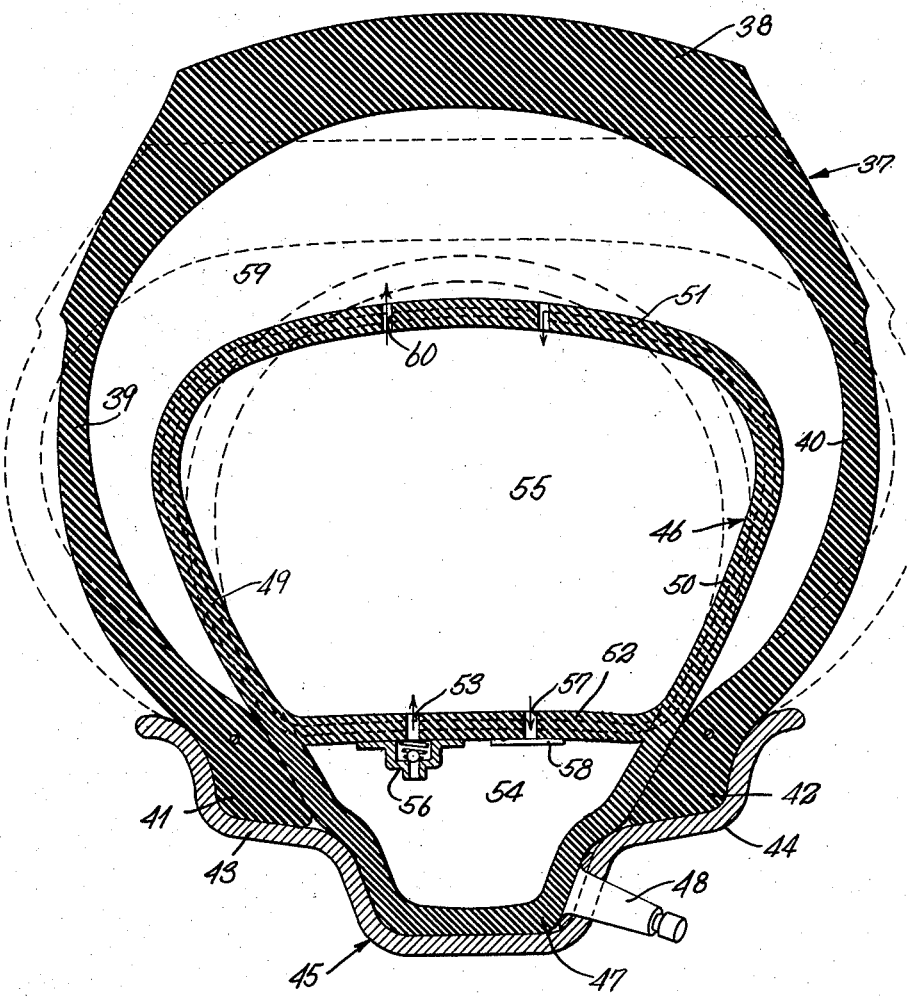
Fig. 2 is a similar section of a tire embodying a modified form of my invention.

In the form of the invention illustrated in Fig. 2 the tire casing 37 is similar to that shown in Fig. 1, comprising a tread portion 38, side walls 39 and 40 and bead portions 41 and 42 seated on the stepped parts 43 and 44 of the rim 45.

The tube 46 comprises a rim portion 47 which is flexible to seal against the rim 45 and the inner surfaces of the bead portions 41 and 42 at the top, thus sealing the tire air-tight. A tire valve 48 is provided in the rim portion for inflating and deflating the inner tube. Above the rim portion 47 the tube is provided with fabric reinforced side walls 49 and 50 and an upper wall 51 immediately beneath the tread portion of the tire casing. The upper and outer part of the tube is separated from the rim portion by a partition 52. The walls 49—52 are of reinforced fabric as, for example, a two-ply cord fabric.

The partition wall 52 is provided with an opening 53 for the admission of air from the space 54 beneath the partition to the space 55 above it. The passage of air through the opening 53 is controlled by a spring which permits air to flow under a predetermined pressure difference from the space 54 into the space 55 but checks any return flow. Return flow of air under slight pressure difference from the space 55 to the space 54 is permitted through a second opening 57 which is closed by a flap 58 which prevents flow of air from the space 54 to the space 55. Through these arrangements there is always pressure in the space 54 at least equal to or greater than that in the space 55 thereby insuring a closing pressure on the walls of the rim portion to seal them air-tight against the bead portions of the tire casing.

The dimensions of the tube are sufficiently smaller than those of the interior of the tire to provide a space 59 between the tube and the tire casing and prevent any direct contact or chafing between the tube and the casing.

Pressure between the space 55 and 59 is equalized slowly by one or more openings 60 which may be of sufficiently small dimension to permit a very slow leak or gradual passage of air in one direction or the other, or which may be provided with valves similar to those of Fig. 1.

When the tube is inflated the air first fills the space 54, sealing the walls of the tube against the bead portions of the tire, and then passes into the space 55 from whence it passes outwardly to the space 59. In the event of a sudden failure of the tire casing the weight of the vehicle will be supported by the reinforced inner tube for a substantial period of time sufficient to enable the vehicle to be brought under control.

In the normal operation of the wheel the tube will take the position shown in full lines when the pressures are substantially equalized, or will move toward the broken line position when being deflated or upon rupture of the tire casing and will thus approach the position of the tire when deflected under load.

The tube of my invention differs from the ordinary single wall tube in that it seals the tire to the rim at the beads and not throughout the inner surface of the tire casing and being spaced from the tire casing is not ruptured in the event of a sudden failure or blow out of the casing. It provides this safety feature simply and cheaply and may be easily mounted and removed from the tire casing.

Having described my invention, what I claim is:

1. A single wall inner tube for pneumatic tires having a rim portion of extensible rubber composition and a fabric reinforced wall extending outwardly beyond said rim portion, inextensible beads at the juncture of said rim portion and said outwardly extending wall, the fabric reinforcement in said fabric reinforced wall being secured to said beads, an inflating valve secured to said rim portion and openings in said reinforced wall for the passage of air to and from the interior of said tube.

2. A pneumatic tire which comprises an outer casing having a fabric reinforcement and comprising a tread, side wall and bead portions, and a single wall, fabric reinforced, inflatable, inner tube spaced from the tread and side wall of said outer casing and sealing air-tight against the bead portions of said outer casing to form an outer compartment sealed between said casing and said tube, said inner tube having a pair of inextensible beads adjacent the bead portion of said outer casing and having fabric reinforcements secured to said inextensible beads of said inner tube, said inner tube having openings for air between the inner tube and said outer compartment.

3. The pneumatic tire of claim 2 having valves in said openings to control the passage of air between the inner tube and the outer compartment.

FRANKLIN O. CHURCH.

REFERENCES CITED

The following references are of record in the file of this patent:

UNITED STATES PATENTS

| Number | Name | Date |
| --- | --- | --- |
| 1,373,485 | Bugg | Apr. 5, 1921 |
| 1,465,867 | Riley | Aug. 21, 1923 |
| 2,168,514 | Darrow | Aug. 8, 1939 |
| 2,268,370 | Barkeij | Dec. 30, 1941 |
| 2,343,828 | Burkley | Mar. 7, 1944 |
| 2,375,127 | Mendelsohn | May 1, 1945 |
| 2,404,578 | Liska | July 23, 1946 |

FOREIGN PATENTS

| Number | Country | Date |
| --- | --- | --- |
| 586,003 | France | 1923 |